(12) United States Patent
Childress

(10) Patent No.: US 7,059,137 B2
(45) Date of Patent: Jun. 13, 2006

(54) PORTABLE THERMOELECTRIC COOLING AND HEATING DEVICE

(76) Inventor: William H. Childress, 8902 Monticello, Grandbury, TX (US) 76049

( * ) Notice: Subject to any disclaimer, the term of this patent is extended or adjusted under 35 U.S.C. 154(b) by 0 days.

(21) Appl. No.: 10/935,972

(22) Filed: Sep. 7, 2004

(65) Prior Publication Data

US 2006/0048519 A1    Mar. 9, 2006

(51) Int. Cl.
*F25B 21/02*    (2006.01)
(52) U.S. Cl. .......................... 62/3.3; 62/3.61; 62/259.2
(58) Field of Classification Search .................. 62/3.2, 62/3.3, 3.61, 3.7, 259.2
See application file for complete search history.

(56) References Cited

U.S. PATENT DOCUMENTS 6,119,463 A * 9/2000 Bell .............................. 62/3.7
6,223,539 B1 * 5/2001 Bell .............................. 62/3.7

* cited by examiner

*Primary Examiner*—Melvin Jones
(74) *Attorney, Agent, or Firm*—Law Office of Steven B. Leavitt, LLP.; Steven B. Leavitt; John Pemberton

(57) ABSTRACT

The present invention uses electric current to either chill or warm air ambient air. The Portable Thermoelectric Cooling and Heating Device is composed of an array of thermoelectric units, a driving fan, a cold sink, a hot sink, air baffles and a cooling fan. The thermoelectric units are arranged in contact with the cold sink (cold side) and hot sink (hot side). Applying a current causes a temperature difference to develop between each side. The driving fan creates a pressure gradient is to pull air through the center of the cold sink. The cooling fan pulls air through an arrangement of baffles connected to the hot sink to help dissipate heat. The result is chilled or hot air, depending on the direction of the current. The invention allows for several improvements over current heating and air-conditioning systems: a simplified design without moving parts, elimination of the need for FREON, improved versatility and others.

18 Claims, 4 Drawing Sheets

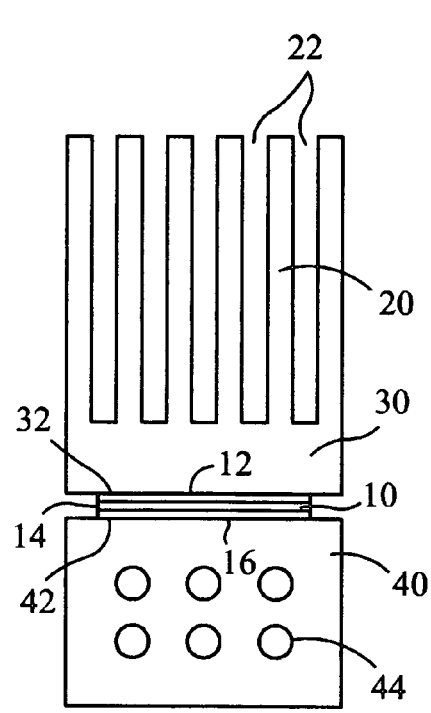
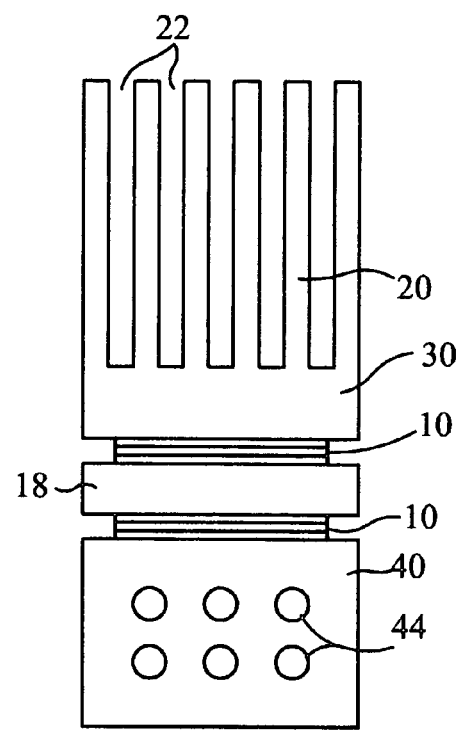
FIG. 1
FIG. 2
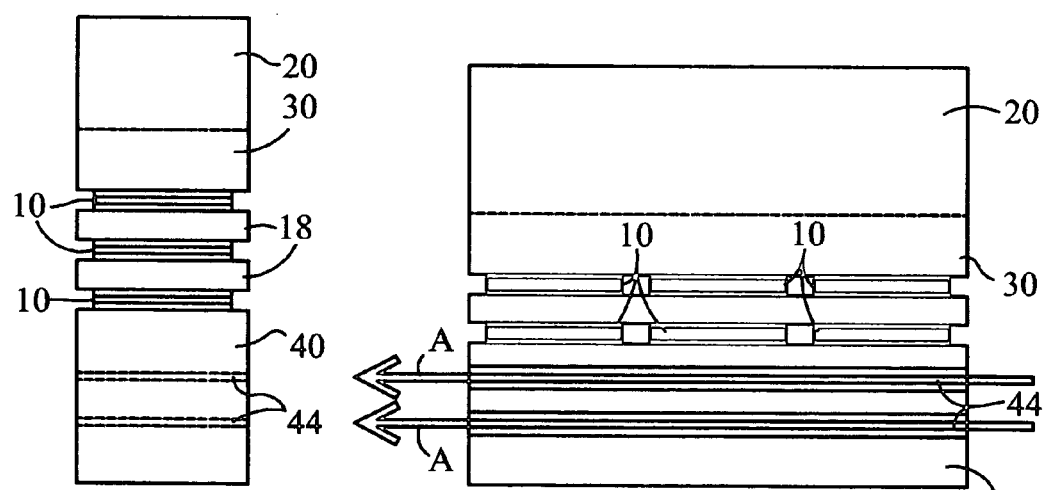
FIG. 3
FIG. 4

PORTABLE THERMOELECTRIC COOLING AND HEATING DEVICE

BACKGROUND OF THE INVENTION

1. Technical Field

The present invention relates to an electronically powered cooling and heating device. More particularly, the present invention relates to an electronically powered cooling and heating device employing thermoelectric modules.

2. Description of Related Art

In the production of automobiles, passenger comfort has been and is a highly valued design component. One element in providing passenger comfort is the control of the environmental conditions in the passenger compartment. To control the temperature, air conditioners and heaters are considered standard equipment capable of fulfilling such need. Until now, automobiles have principally relied on essentially the same technology for interior temperature control. The heater utilizes the heat produced by the internal combustion engine of the vehicle to provide heat to the passenger compartment. The air conditioner operation utilizes a refrigeration cycle wherein a refrigerant, such as chlorofluorocarbons, are used to produce chilled air.

The concept and design of an automobile heater is simple. When the heater is activated, air is drawn through tubing surrounding the engine block. Ambient air is drawn from outside the vehicle and is conveyed passed the engine block where the cooler air absorbs heat. The now heated air is then supplied into the passenger compartment as desired. But this traditional design is problematic under different conditions: the temperature of the vehicle's engine is too low;

1) the intake (outdoor) air is too cold; or
2) the engine is not using internal combustion.

The two former situations arise in cold environments: the engine is cold or the outdoor air is too cold to be adequately warmed. However, these scenarios are when an effective heater is extremely important to the passenger. The latter situation arises more often today, as technology leads to alternatives to internal combustion engines.

In recent years, automobile manufacturers have seen a growing demand for alternatives to the traditional internal combustion-driven automobiles. Rising fuel prices, tensions in the oil-producing countries and a growing concern for the environment have stimulated the demand. Automobile manufacturers have responded by producing electric vehicles and hybrid-electric vehicles. As engines become more efficient, less energy is wasted in the form of heat. Traditional heaters may not be practical in these vehicles because they cannot utilize the heat that is expended from traditional internal combustion engines. While the traditional automobile heater may be imperfect, the automobile air conditioner presents even greater need for improvement.

A majority of vehicles produced today are equipped with air conditioning systems. Although there are different types, the concept and design are essentially the same. A belt driven pump is fastened to the engine. By increasing the drag on the engine, the pump drives the condenser. The condenser compresses refrigerant gas into a liquid state whereby heat is produced due to the heat of condensation which is expelled to the atmosphere outside of the vehicle. The refrigerant is then allowed to evaporate whereby heat is absorbed from air being conveyed passed coils. This cool air is conveyed into the passenger compartment to provide a cooled passenger compartment. Although air conditioners have improved over the years, automobile air conditioners still present many problems.

Even the most advanced air conditioners are bulky systems that require a myriad of rotating parts and operate under high-pressure. The belt-driven design requires that they be mounted in close proximity to the engine. And the condenser must be situated to permit allow air from the engine fan and forced air from the movement of the car to flow past it. Moreover, no matter how well an air conditioner is maintained, eventually it will present problems and require repair. Mechanical problems occur as the belts transfer torque. And the hoses, tubing and fittings that operate under high pressure will gradually wear and/or corrode. A failure of any part of the system will cause the entire system to languish. However, the most common and most significant problems are associated with the requirement of refrigerant gases.

Traditional automobile air conditioners commonly use an air conditioning unit employing refrigerant gas such as FREON (FREON is the trade name for the refrigerant R-12, that was manufactured by DuPont) or other chlorofluorocarbons (CFC's) or hydrochlorofluorocarbons (HCFC's). An adequate amount of the refrigerant gas is essential to produce temperature change as it is pumped through the condenser. As refrigeration units operate under pressure, these systems must be maintained by effective sets of seals to prevent leakage. And like other refrigerants, FREON is an odorless, colorless gas, making leaks difficult to find and repair. Most people will not recognize a problem with their air conditioner until much of the refrigerant has already escaped into the atmosphere. Not only do leaks of chlorofluorocarbons lead to expensive repairs, they cause great damage to the Earth's environment.

The release of FREON and other CFC's or HCFC's into the atmosphere has been blamed for the decay of the Earth's ozone layer. When ultraviolet light waves from the sun strike CFC or HCFC molecules in the upper atmosphere, a carbon-chlorine bond may break. A chlorine atom forms and then may react with ozone ($O_3$) molecules to yield oxygen ($O_2$) and chlorine monoxide (Cl-0). Then a free oxygen atom causes the chlorine monoxide molecule to purge the chlorine atom to form oxygen ($O_2$). This chlorine is free to repeat the process in a vicious cycle. For example, each FREON molecule in the atmosphere is estimated to have an average life of 120 years and can destroy 100,000 ozone molecules or more. Thus a CFC molecule released in 2004 will still be damaging the ozone layer in 2114. The known effects of ozone depletion are numerous.

As the stratospheric ozone layer is depleted, higher UV-b levels reach the earth's surface. Increased UV-b can lead to more cases of skin cancer, cataracts, and impaired immune systems. Many of our essential crops, such as corn, barley, hops, wheat and soybeans, may become damaged, decreasing their yield. Phytoplankton, a plant in the ocean, also is affected. Depletion of this important link in the marine food chain could reduce the number of fish in the ocean. It also can increase the level of carbon dioxide in the atmosphere because phytoplankton absorbs carbon dioxide in their food and energy making processes.

However, much of the FREON that is produced will escape into the environment even with careful use. Moreover, regulations lead to greater costs to the consumer. The best solution lies in technology that replaces traditional air conditioners, thus eliminating the need for and production of FREON. While other refrigerants may be less harmful to the environment than FREON, substitute CFC's and HCFC's do still degrade the ozone layer.

What is needed is an improved cooling and heating device that would eliminate the need for CFC's or HCFC's. This would curb the production of CFC's and the like and ultimately reduce the amount that is released into the atmosphere, preventing ozone depletion, global warming and pollution. Also, a device that provides a simplified design with fewer moving parts will permit greater dependability and reduce the costs of installation, repair and service. Such a system should be able to operate without the requirement of torque generated by an engine, unlike traditional belt-driven units that must be attached or mounted next to the engine. A further quality desired would be that the device work interchangeably as both a heater and air conditioner, thus permitting the consumer to get heated air as well as cooled air. Thus, a device that provides greater versatility, permits the device to be produced in a small, compact size thus being suitable for use as a portable air conditioner/heater as well as an automobile air conditioner/heater would be desirable.

SUMMARY OF THE INVENTION

Automobile heaters require convection of heat from the engine. Thus, traditional heaters are impractical without a hot internal combustion-driven engine. Moreover, an alternative design is necessary for new automobiles that utilize electric motors and more efficient hybrid technology.

Automobile air conditioners utilize a myriad of moving parts and operate under high pressure. Even if well maintained, they frequently present problems and require costly repair. And as the main source of artificially produced CFC's, air conditioners are responsible for ozone depletion. This leads to high levels of UV-b entering the atmosphere, the results of which are potentially disastrous.

The present invention provides a simplified heating and cooling device. Electric current is used to produce either hot or cold air without a complicated contraption or high-pressure hoses. Moreover, the invention operates without the use of environmentally unfriendly CFC's.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a cross-sectional view of a thermoelectric device for heating and cooling employing one thermoelectric unit;

FIG. 2 is a cross-sectional view of a thermoelectric device for heating and cooling employing two thermoelectric units;

FIG. 3 is a side planar view of a thermoelectric device for heating and cooling employing three thermoelectric units;

FIG. 4 is a side cross-sectional view of a thermoelectric device for heating and cooling employing three sets of two thermoelectric units in series;

DETAILED DESCRIPTION

Figure 5:
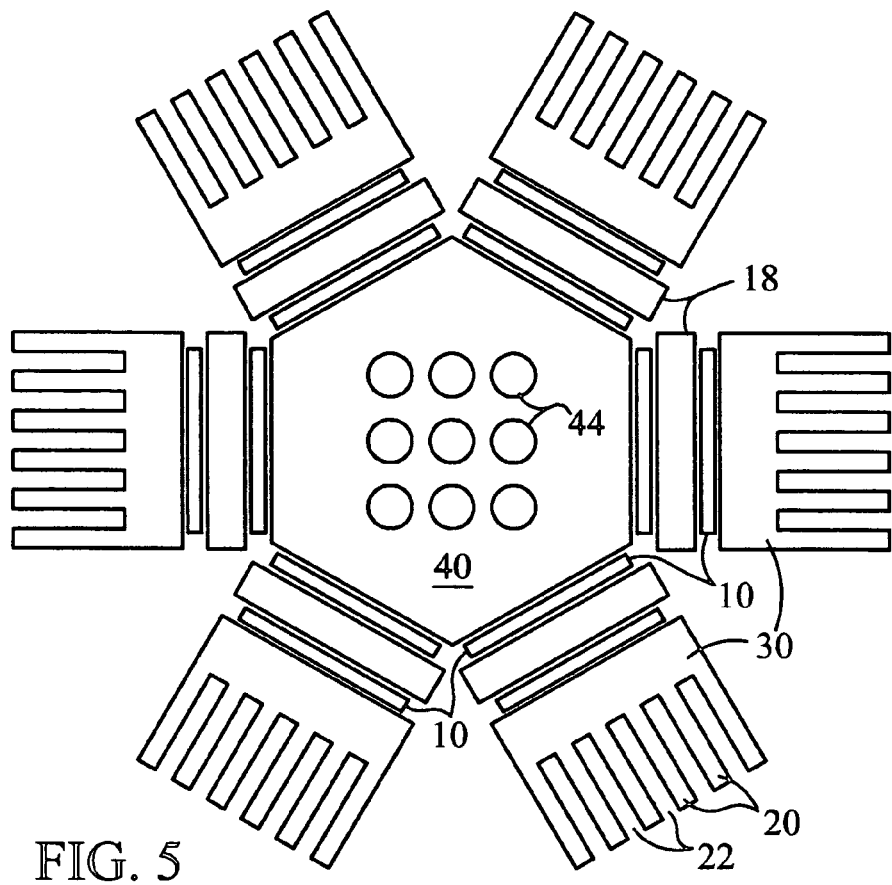
FIG. 5 is a cross-sectional view of a first embodiment of a thermoelectric device for heating and cooling employing a plurality of two thermoelectric units surrounding a common cold (or hot) sink.

A thermoelectric module (Peltier module) utilizes the Peltier effect to produce a temperature change. It consists of semiconductors mounted successively, which form p-n and n-p junctions. Each junction has a thermal contact with radiators. Applying a current of definite polarity causes a temperature difference to form between the radiators. One side works as a heat sink (hot side heat sink) and warms up; the opposite side works as a cold sink (cold side heat sink) and becomes cold. Reversing the polarity of the current reverses the hot and cold sides: the hot side becomes cold and the cold side becomes hot.

A typical module may produce a temperature change of several tens of degrees Celsius. The temperature difference may be increased with forced cooling of the hot sink. Doing so permits the cool side to reach temperatures below freezing (0° C./–32° F.). By arranging the modules in stacks, known as cascades, the hot sink which is force cooled by another thermoelectric unit. Stacking the modules allows a temperature change between the hotsink and coldsink of greater than 100° C./212° F.

One preferable use of the invention is as a portable heating and cooling system. While this invention pertains to a portable heating and cooling system, it is to be understood that the invention can be utilized for other types of systems and hence, is not limited to use as an automobile heating and cooling system. The invention is first described with the accompanying diagrams for use as a portable or automobile air conditioner.

To better understand the invention, FIGS. 1 and 2 illustrate two preferred arrangements of thermoelectric units. In FIG. 1, a thermoelectric unit 10 is sandwiched between a hot sink 30 and a cold sink 40. Planar surface hot side 12 of unit 10 faces hot sink 30 along contact side 32. Hot sink 30 has a sufficiently large surface area to aid in the dissipation of heat extracted from cold sink 40. The heat is conducted up to cooling fins 20 disposed above hot sink 30. As ambient air is passed through void spaces 22 between individual plates of fins 20, heat is absorbed by the cooler ambient air. Planar surface cold side 16 of unit 10 faces cold sink 40 along contact side 42. Disposed within cold sink 40 are air conduits 44 for allowing ambient air to be cooled. In a preferred use of the present invention, conduits 44 allow the cooling of external ambient air to be cooled for supplying to a passenger compartment of a vehicle. Side edges 14 of the thermoelectric units 10 may be sealed with a bead of high temperature rubber or other suitable material (not shown) to prevent intrusion of contaminants, such as, for example, moisture, dirt, or other particulate matter. Also, small moisture drain holes (not shown) may be used to allow condensation to drain away from the thermoelectric device. Beneficial locations of such drainage holes may be adjusted depending on particular designs and/or applications of the thermoelectric device.

Thermoelectric units 10 may be stacked on top of one another to increase the temperature difference. This is illustrated in FIGS. 2 and 3 which show two-module and three-module stacks, respectively.

With the two-module stack of FIG. 2, cold side 16 of the upper module faces the hot side of the lower module. The units are separated by a heat-conducting spacer 18. The spacer 18 is made from metal, ceramic or other suitable heat conduction material. In one embodiment employing a thermoelectric device in accordance with the present invention, a temperature change from cold sink 40 to hot sink 30 is approximately 140° F. is attainable. As hot sink 30 approaches an operating temperature of about 150° F., cold sink 40 would be chilled to about 10° F. The metal spacer 18 maintains a midpoint temperature between hot sink 30 and cold sink 40.

The hot sink 30 is best situated in an area to maximize exposure to circulating air. Hence, in an automobile, it is placed such that intake ambient air flows passed heat exchanging fins 20 through void spaces 22 that are disposed adjacent to and in communication with hot sink 30. As air flows through fins 20, heat is removed from hot sink 30, thus the temperature of cold sink 40 drops further. Hence, the resulting temperatures of the hot and cold sinks will vary depending on the temperature of outside air and velocity of the airflow passing through hot sink 30 in addition to the current being applied to the system.

In an alternative embodiment, a liquid may be used to extract heat from hot sink 30. For example, hot sink 30 may be subjected to a circulating pool of liquid (not shown). A design employing a similar design to a traditional automotive radiator is suggested. Various cooling solutions such as commercially available antifreeze would be well suited for use in such a design. A lower temperature is achievable at the cold sink 40 with such a cooling system at the hot sink 30 in comparison to a system strictly using air flow.

FIG. 1 also features cold side 16 of a single thermoelectric unit 10 attached to the cold sink 40. Conduits 44 through the center of the cold sink 40 permit air to pass through where it is chilled by convection. In one example, an application of 12 Volts and 5 Amperes to unit 10 can reduce the temperature of the ambient air to approximately 10° F. However, as mentioned earlier, the temperature depends on several factors and will decrease by increasing the heat dissipation from hot sink 30.

FIG. 3 depicts a side planar view of a three-tiered stack of units 10 with spacers 18 disposed between the top and middle units 10 and between the middle and bottom units 10. For additional heating/cooling ability, several units 10 may be stacked to advantageously utilize an additive effect from having units 10 in operable communication. The principle remains the same in that greater numbers of thermoelectric units 10 may be stacked to achieve significant reductions in temperature. This ability is limited only by the materials comprising these devices to withstand extreme temperatures and be able to conduct heat and electrical current. Because the invention may achieve such temperatures, it has many potential applications other than conditioning air for human comfort. Another possible use would be in low-temperature freezers and in medical/laboratory equipment that require flash freezing or would otherwise use liquid nitrogen providing that sufficient and capable materials are utilized.

FIG. 4 shows another view of a heating and cooling device in accordance with the present invention. Arrows A denote the flow of air through the passages 44 within cold sink 40. The length of the passages are sufficient so that ambient air entering the device has sufficient contact area to allow heat from the air to be absorbed into the cold sink. Thereby, the temperature of the cooled air is lowered to a desired temperature for supplying to a passenger compartment of an automotive vehicle for example.

Stacks of thermoelectric units 10 separate the hot sink 30 from the cold sink 40. If a greater temperature differential is necessary for increased heating or cooling, greater numbers of the thermoelectric units 10 may be stacked.

FIG. 5 depicts another variation of arranging thermoelectric module units 10. The cold sides of stacked multiple thermoelectric units 10 are mounted to a multisided common cold sink 40. Here, a six-sided cold sink 40 is depicted. The parallel effect of units 10 leads to a greater temperature difference between cold sink 40 and hot sinks 30 as compared to solely using stacked units 10 disposed serially. Another advantage with this arrangement is greater efficiency. Each side of a bottom unit 10 is attached to cold sink 40 so that there is a minimal amount of exposed cold sink 40 without coverage by a unit 10. Hence, heat gain from the outside environment of the thermoelectric device is minimized. Further, insulation layer 34 which surrounds cold sink 40 along the length of apparatus 60 aids in unwanted heat gain.

This arrangement also provides a versatile shape. The multi-sided wafer shape allows the consumer to attach multiple arrangements together, thus increasing the surface area of the cold sink 46. The intake air travels a greater distance and is cooled to a lower temperature. This versatility also allows the user an easy way to optimize a cold sink 46. One may lengthen or shorten the cold sink to achieve the desired cooling effect while minimizing the amount current used current to a minimum.

Figure 6:
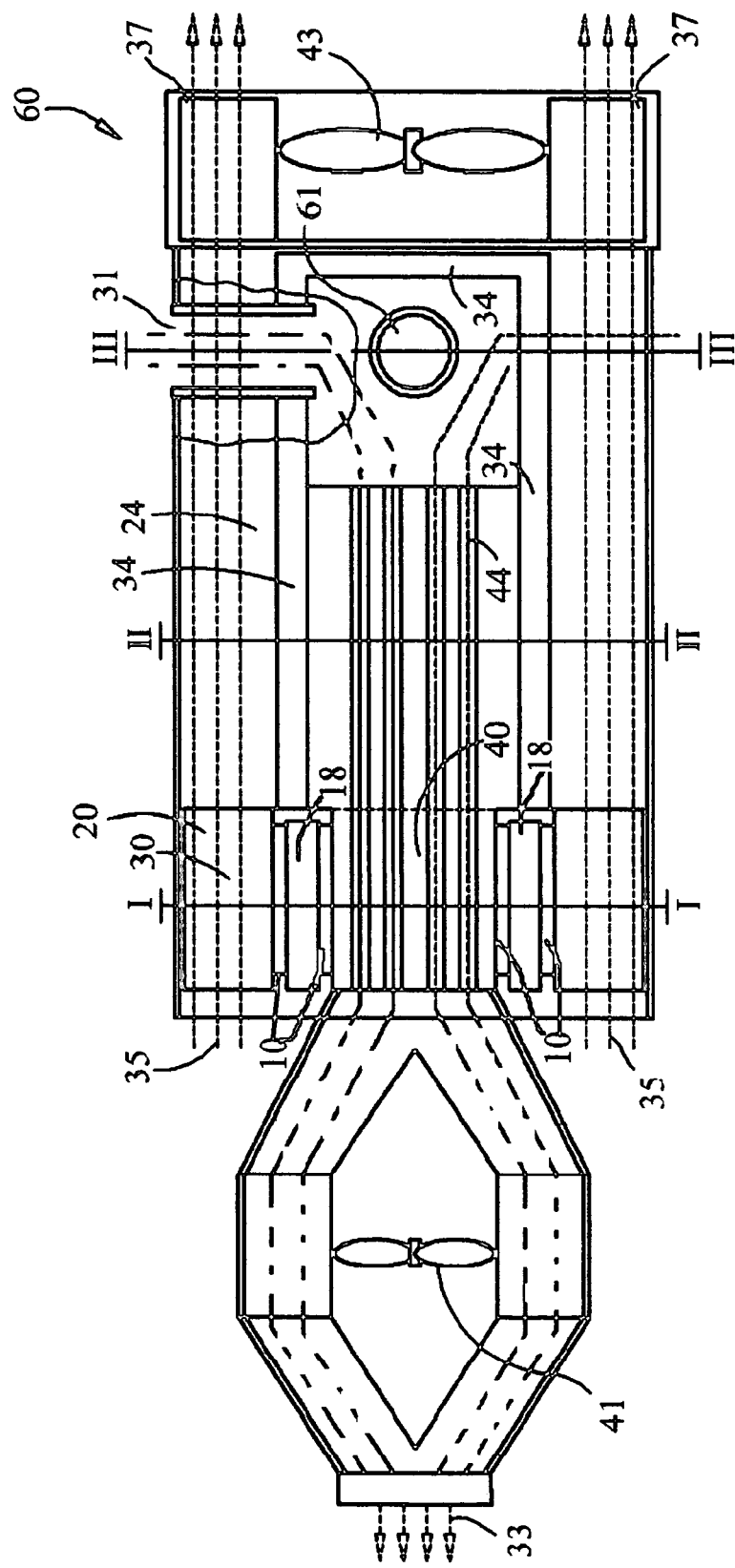
FIG. 6 is a side cross-sectional view of a heating and cooling device employing a thermoelectric device.

FIG. 6 shows an interior view of a thermoelectric heating and cooling apparatus 60, which as shown is designed preferably for use with an automobile. It is generally cylindrically shaped and uses fans 41 and 43 at each end. Air expelled from cold end vents 33 (smaller end) is cooled air to a temperature below the ambient air temperature surrounding apparatus 60. Air expelled from warm end vents 35 (larger end) is heated above the ambient air temperature surrounding apparatus 60.

Passages 44 traverse through the entire distance of the apparatus through cold sink 40. The driving fan 41 creates a pressure change to draw air through the passages 44. Ambient air enters from outside apparatus 60 through opening 31, travels through the center of the cold sink 40 and passes through the driving fan 41. The driving fan 41 then forces the chilled air outward through vents 33 whereby the cooled air can be directed, for example, to the interior of an automobile passenger compartment.

Figure 7:
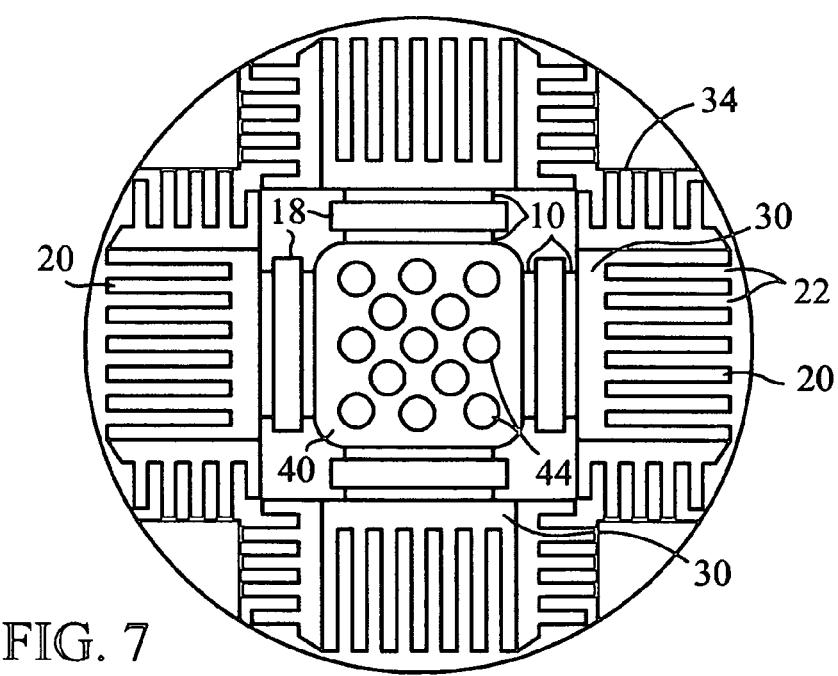
FIG. 7 is a front cross-sectional view of a second embodiment of a thermoelectric device for heating and cooling employing a plurality of two thermoelectric units surrounding a common cold (or hot) sink along line I—I in FIG. 6.
Figure 8:
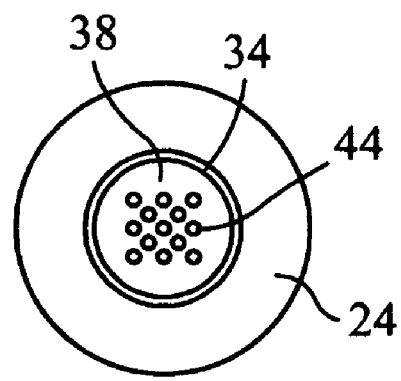
FIG. 8 is a partial front cross-sectional view of air conduits following thermoelectric units along line II—II of FIG. 6.

FIG. 7 shows a cross-sectional view along line I—I in FIG. 6. Air enters from the outside entrance vents 35 and passes through heat exchanger 20, which is disposed above and in communication with hot sink 30. The cooling fan 43 drives ambient air in the opposite direction of the air flowing through passages 44. After the air passes through heat exchanger 20, it passes through heated-air exhaust 24 as shown in FIG. 8, which is a cross-sectional view along line II–II. The heated air is then expelled by the cooling fan 43 and is exhausted out the warm end vents 37. Extracting heat away from apparatus 60 allows cold sink 40 to reach a lower desired temperature.

Particular to the arrangement shown in FIG. 7, a four-sided cold sink 40 is depicted. This arrangement maximizes the space available for an arrangement of heat exchanger 20 shown as baffling. The baffling heat exchanger 20 in this embodiment may optionally be supported by supports 34.

With relatively large surface area of heat exchanger 20 improved extraction of heat from apparatus 60 is provided. Heat exchanger 20 may be cooled in an alternative design involving immersion of the baffling in liquid and then circulating such liquid similar to an automobile radiator.

Figure 9:
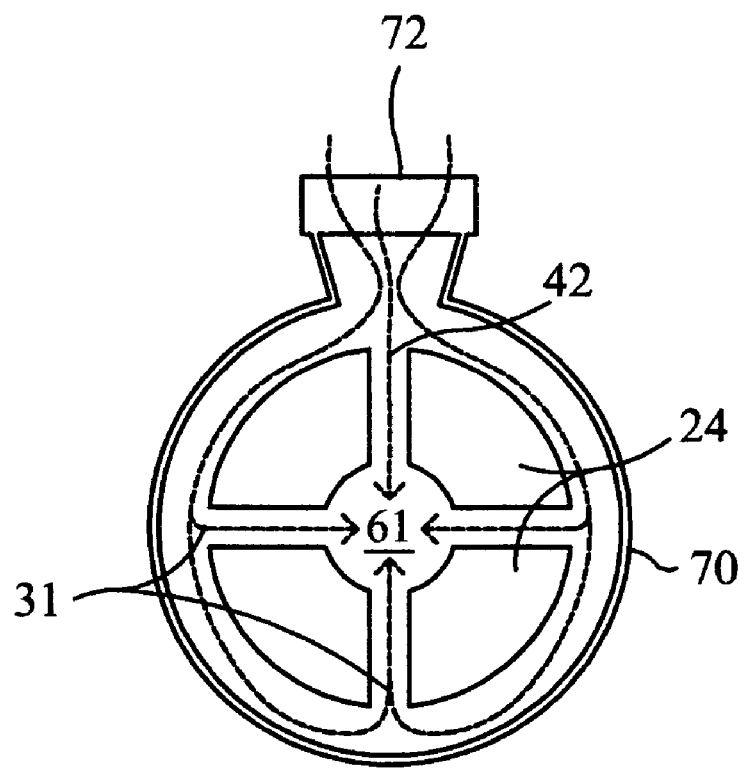
FIG. 9 is a partial front cross-sectional view of an ambient air entrance for the heating and cooling device of FIG. 6 shown along line III—III.

The air intake/cooling system illustrated in FIG. 9 is a cross-sectional view along line III—III in FIG. 6. Ambient air enters apparatus 60 via intake 72 and passes through inlet paths 42. The air is then fed into intake vent 61 for passing on to cold sink 40. The dashed lines represent the direction of airflow.

To control the electrical application of apparatus 60, a master control system (not shown) may be tied into the automobile computer system and utilize multiple thermoelectric modules arranged in series. This permits the user to vary the number of active thermoelectric modules according to needs. Switches may be activated either by the user of apparatus 60 via remote means or via a thermostat to detect and maintain a set temperature.

The end result of the system is a temperature difference between ambient air and expelled air of greater than 100° F. This temperature difference will depend primarily on the arrangement of thermoelectric units as well as the current that is applied to the system. While not discussed above, reversing the polarity of the current causes the thermoelectric units to work in reverse. Thereby, heated air may be supplied to a passenger compartment of a vehicle. The air conditioner then becomes a heater at the whim of the user.

Utilizing the temperature changed produced by thermoelectric modules allows for several improvements over traditional heating/cooling systems. The invention is more environmentally friendly, reliable, versatile and cost effective than traditional heating/air conditioning systems.

Scientific studies have demonstrated that FREON causes depletion of the earth's ozone layer. FREON and other refrigerants, classified as CFC's (chlorofluorocarbons), react with the protective layer of ozone in the earth's atmosphere. The reaction occurs in a vicious cycle as a single CFC molecule may react with 100,000 ozone molecules.

The invention eliminates the need for FREON and other refrigerants. Employing thermoelectric technology will curb the production of CFC's and ultimately reduce ozone depletion, preventing global warming and pollution.

The invention provides a simplified design with fewer moving parts. It uses fans to shuttle air through the unit where heat is produced electronically. There are no hoses or tubes which are often problematic in traditional air conditioners. Moreover, the thermoelectric air conditioner operates at a low pressure, eliminating the need for high-pressure connections or fittings. This permits greater dependability and may lead to reduced costs of installation, repair and service.

In signing the Montreal protocol, the U.S. and other countries adopted strict legislation to regulate the production and use of FREON. Mechanics that service air conditioners or purchase FREON and other CFC's or HCFC's must be certified. They must follow rigid guidelines when servicing air conditioner to prevent it from escaping into the atmosphere. The end result is increased cost of repair and service to the consumer. Because the invention does not use FREON or other CFCs/HCFC's, its assembly and service may be less expensive than traditional air conditioning units.

The invention operates without the requirement of torque generated by an engine. It may be mounted at a location most amiable to manufacturer assembly or consumer use. This is in contrast to traditional belt-driven units that must be attached or mounted next to the engine.

The invention also works interchangeably as both a heater and air conditioner, thus permitting the consumer to get heated air as well as cooled air. Moreover, its compact size provides greater versatility, permitting its use as a portable air conditioner/heater as well as an automobile air conditioner/heater.

While described as a portable cooling and heating device, apparatus made in accordance with the present invention has many other potential applications. The design is conducive for small and large units and its size may be optimized for its intended use. And the arrangement and number of thermoelectric units may be varied to satisfy the user's cooling/heating needs. Other potential applications are: engine/motor cooler, home air conditioner/heater, refrigeration system and liquid cooler/heater.

While the invention has been particularly shown and described with reference to a preferred embodiment, it will be understood by those skilled in the art that various changes in form and detail may be made therein without departing from the spirit and scope of the invention.

What is claimed is:

1. A portable heating/cooling system, comprised of:
   (a) a multi-sided heat exchanger made of metal with high heat conductivity;
   (b) said heat exchanger having holes running lengthwise through its center;
   (c) a stacked arrangement of thermoelectric modules attached to periphery of said heat exchanger;
   (d) an inlet duct for allowing ambient air to enter said passageways;
   (e) a driving fan for forcing ambient air through said heat exchanger;
   (f) a vent in which chilled or heated air is directed away from the system;
   (g) a heat dissipating unit for cooling the hot sides of the thermoelectric units;
   (h) a master control unit for determining the polarity of current through said thermoelectric modules;
   (i) a master control unit for adjusting the temperature of expelled air from said heating/cooling system;
   (j) an of arrangement of thin-shaped metal heat sink wafers or baffles attached to periphery of heat sink, constructed to maximize surface area;
   (k) a cooling fan for forcing ambient air through arrangement of said wafers or baffles;
   (l) an inlet duct to allow ambient air to enter said heat dissipating unit; and
   (m) a vent to expel heated air from said heat dissipating unit.

2. The portable heating and cooling system of claim 1 wherein said master control unit comprises:
   (a) a remote control unit;
   (b) sensor modules to detect the temperature of the user's environment;
   (c) electronic switches that control whether current passes through thermoelectric units; and
   (d) said electronic switches arranged to permit current to pass through thermoelectric units in series or in parallel.

3. The portable heating and cooling system as disclosed in claim 1, wherein the polarity of current determines whether the system operates as a heater or air conditioner.

4. The portable heating and cooling system as disclosed in claim 1, wherein said thermoelectric modules are arranged in stacks to increase the temperature change between their hot and cold sides.

5. The portable heating and cooling system as disclosed in claim 1, wherein said heat exchanger is shaped with multiple sides around its perimeter to permit the designer to vary the number of attached thermoelectric module units.

6. The portable heating and cooling system as disclosed in claim 1, wherein the outside edges of said thermoelectric modules are sealed with beads of high-temperature rubber or other similar material to prevent intrusion of contaminates (e.g. moisture, dirt or other particulate matter).

7. The portable heating and cooling system as disclosed in claim 1, wherein the outside edges of said thermoelectric modules are sealed with beads of high-temperature rubber or other similar material that contains small moisture drain holes to void condensate moisture.

8. The portable heating and cooling system as disclosed in claim 1, wherein the user adjusts the polarity and intensity of current which determines the temperature of expelled air.

9. The portable heating and cooling system as disclosed in claim 1, wherein the portable heating and cooling system is used in an automobile in which the master control may be tied into the automobile's computer system.

10. A portable heating and cooling system for adjusting the temperature of ambient air, the portable heating and cooling system comprised of:
  (a) a multi-sided heat sink;
  (b) a system of thermoelectric modules attached to the heat sink wherein multiple thermoelectric modules are stacked upon each other to increase the achieved temperature difference between their hot and cold sides;
  (c) an arrangement of thin metal wafers attached to hot-sides of said thermoelectric modules to conduct heat away from said heat sink;
  (d) a cooling system in which liquid coolant is used to dissipate heat from said metal wafers.

11. The portable heating and cooling system of claim 10 that utilizes thermoelectric modules to heat or cool ambient air.

12. The portable heating and cooling system of claim 10 wherein the thermoelectric units are arranged adjacently to one another around a cylindrically-shaped heat sink.

13. The portable heating and cooling system of claim 10 wherein the exterior sides of said thermoelectric modules are attached to a heat dissipating system comprised of:
  (a) an arrangement of heat-conducting metal structures shaped like thin wafers to maximize the surface area for dissipating heat;
  (b) a variable speed blower for blowing air through the arrangement of heat-conducting metal structures.

14. The portable heating and cooling system of claim 10 wherein the thermoelectric units are stacked in a cascade arrangement, to increase the temperature change that is achieved across them.

15. The portable heating and cooling system of claim 10 wherein the polarity and intensity of current is altered by the user to control the temperature of vented air.

16. The portable heating and cooling system of claim 10 wherein a master control determines the polarity of current through said thermoelectric modules.

17. The portable heating and cooling system of claim 10 wherein temperature sensor modules adjust the polarity and intensity of current to control the temperature of vented air.

18. The portable heating and cooling system as disclosed in claim 10, wherein the portable heating and cooling system is used in an automobile, motor home, trailer or shelter.

* * * * *